United States Patent
Demizu et al.

[11] Patent Number: 5,116,259
[45] Date of Patent: May 26, 1992

[54] MISFIRE DETECTING DEVICE OF AN INTERNAL COMBUSTION ENGINE

[75] Inventors: Akira Demizu; Akihiro Nakagawa; Toshiki Kuroda, all of Himeji, Japan

[73] Assignee: Mitsubishi Denki Kabushiki Kaisha, Tokyo, Japan

[21] Appl. No.: 696,808

[22] Filed: May 7, 1991

[30] Foreign Application Priority Data

Jun. 5, 1990 [JP] Japan .................... 2-148222

[51] Int. Cl.⁵ .......................................... G01L 23/22
[52] U.S. Cl. ................................................. 73/117.3
[58] Field of Search ............. 73/35 K, 117.3, 116, 73/118.1

[56] References Cited

U.S. PATENT DOCUMENTS

| | | | |
|---|---|---|---|
| 4,403,505 | 9/1983 | Hattori et al. | 73/117.3 |
| 4,449,501 | 5/1984 | Greeves | 73/35 |
| 4,567,755 | 2/1986 | Ootsuka et al. | 73/117.3 |
| 4,781,059 | 11/1988 | Suzuki et al. | 73/117.3 |
| 4,991,554 | 2/1991 | Wataya | 73/117.3 |

FOREIGN PATENT DOCUMENTS 62-26345 4/1987 Japan .

Primary Examiner—Hezron E. Williams
Assistant Examiner—Howard Wisnia
Attorney, Agent, or Firm—Sughrue, Mion, Zinn, Macpeak & Seas

[57] ABSTRACT

A misfire detecting device for an internal combustion engine comprises an inner cylinder pressure detector, a crank angle detector, and a misfire detector for determining that a misfire has occurred when the inner cylinder pressure at a predetermined crank angle after top dead center in an engine combustion cycle is below a predetermined value.

1 Claim, 6 Drawing Sheets

FIGURE 3B (Cylinder I.D.)

FIGURE 3C (Crank angle)

MISFIRE DETECTING DEVICE OF AN INTERNAL COMBUSTION ENGINE

BACKGROUND OF THE INVENTION

1. Field of the Invention

The present invention relates to a misfire detecting device of an internal combustion engine capable of detecting a misfire due to an abnormality in an ignition system of an engine or the like.

2. Discussion of Background Formerly, as this kind of device, there is a device which is for instance disclosed in Japanese Unexamined Patent Publication No. 26345/1987. In this disclosure, an inner cylinder pressure of an engine is detected by an inner cylinder pressure sensor, and a crank angle at which the inner cylinder pressure has a peak, is obtained. When this peak position falls in a predetermined crank angle range, the running condition of the engine is judged to be normal.

However, in the conventional device, it is necessary to measure the inner cylinder pressure continuously for each crank angle in a predetermined period. Therefore, the device becomes complicated. The judgment of misfire is difficult to determine in a light load running condition, since the peak of the inner cylinder pressure has two values; one corresponding to a compression top dead center, and the other corresponding to a peak by combustion. Moreover, when the inner cylinder pressure has a peak before the compression top dead center, the judgment of the misfire is impossible.

SUMMARY OF THE INVENTION

It is an object of the present invention to provide a misfire detecting device of an internal combustion engine capable of detecting the misfire in an inexpensive way, and in spite of the running condition of the engine.

According to an aspect of the present invention, there is provided a misfire detecting device of an internal combustion engine which comprises:

pressure detecting means for detecting an inner cylinder pressure;

crank angle detecting means for detecting a crank angle; and misfire detecting means which judges a misfire when the inner cylinder pressure at a predetermined crank angle after top dead center in the compression stroke in an engine combustion cycle, is below a predetermined value.

The predetermined value may be determined by a combination of a load detecting means and a revolution number detecting means as a criteria value for the misfire detecting means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A, 3B and 3C are diagrams showing the relationship between the crank angle and the inner cylinder pressure;

DESCRIPTION OF THE PREFERRED EMBODIMENTS

Figure 1:
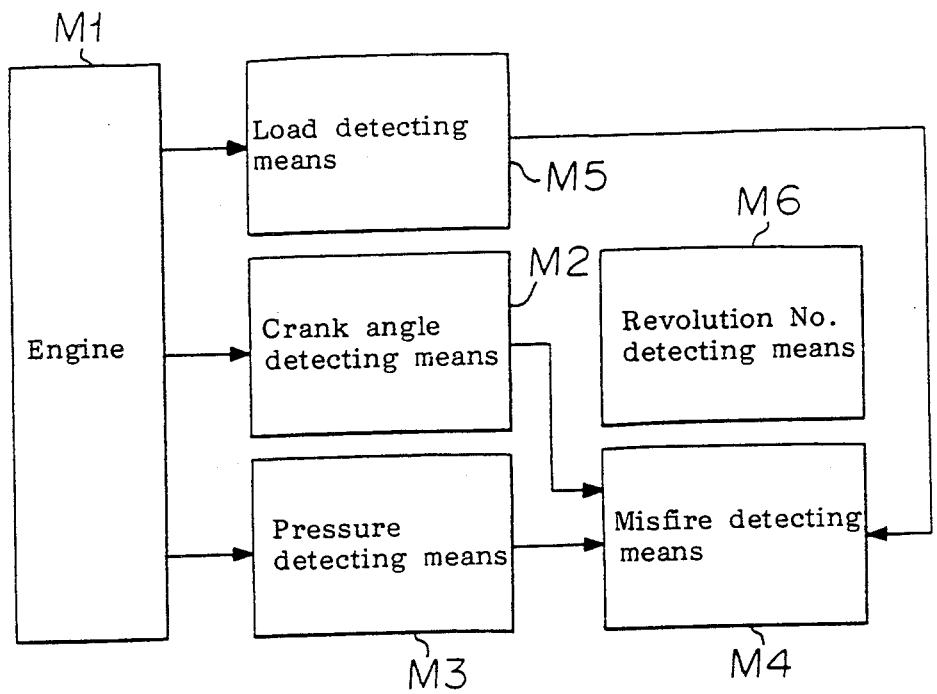
FIG. 1 is a block diagram showing the structure of the present invention.

FIG. 1 is a block diagram showing the structural elements of the invention. In FIG. 1, M1 is an engine, M2, a crank angle detecting means which outputs pulses for each reference position of crank angle and each unit angle of crank angle, M3, a pressure detecting means which detects an inner cylinder pressure, and M5, a load detecting means which detects the load of the engine. The load detecting means may be an air-flow meter for measuring suction air quantity of an engine, not shown, or a suction pipe pressure sensor, or a throttle valve opening degree sensor which detects the opening degree of a throttle valve which regulates the suction air. M6 is a revolution number detecting means, which measures a period between predetermined crank angles, from a signal of the crank angle detecting means M2, and detects the revolution number of the engine. M4 is a misfire detecting means, which detects a running condition of the engine from signals of the load detecting means M5 and the revolution number detecting means M6, and makes a misfire judgment corresponding to the running condition of the engine by measuring the pressure and a predetermined crank angle range, from signals of the crank angle detecting means M2 and the pressure detecting means M3.

Figure 2:
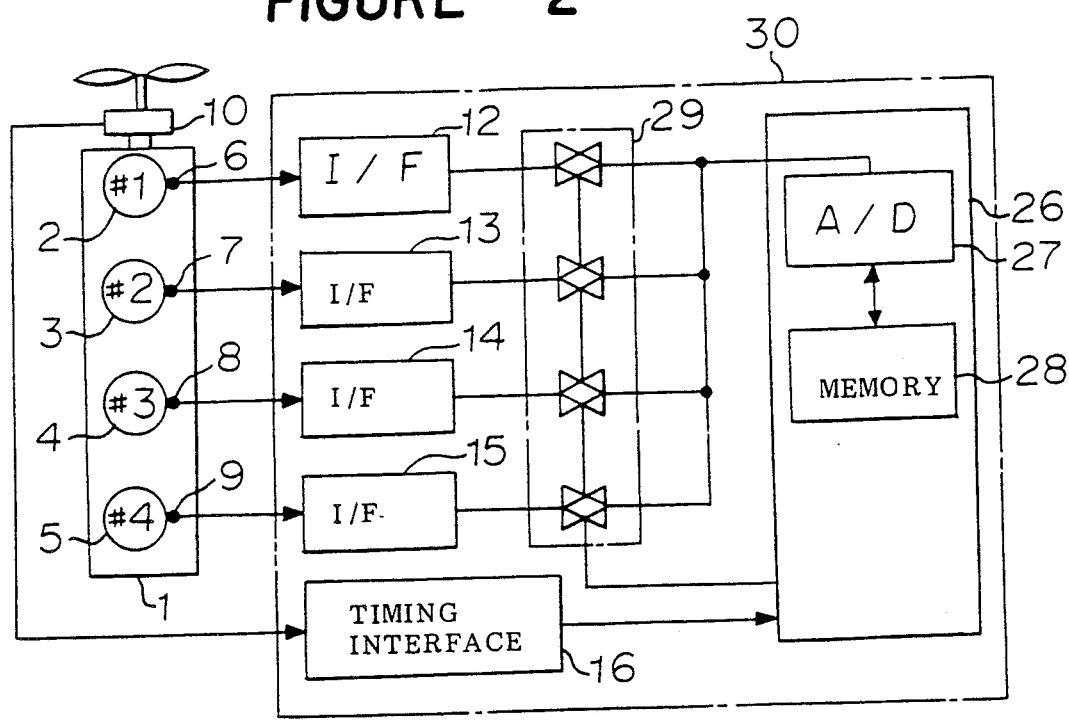
FIG. 2 is a block diagram of advise of an embodiment of a device according to the present invention.

FIG. 2 is an embodiment of the device according to the present invention. In FIG. 2, a numeral 1 signifies an engine having #1 to #4 cylinders 2 to 5. Numerals 6 to 9 signify pressure sensors which detect pressure of cylinders 2 to 5. A piezoelectric element which generates electric charge corresponding to the change of the inner cylinder pressure, or a semiconductor pressure sensor which detects the pressure as a change of the resistance value by introducing the pressure to a semiconductor diaphragram, may be used for the pressure sensor. A numeral 10 signifies a crank angle sensor which determines a timing of the pressure detecting, by outputting a reference position pulses, for instance, for every reference position of crank angle (every 180 degrees or every 720 degrees), and unit angle pulses for every unit angle (for instance every 1 degree). A numeral 30 is an inner cylinder pressure sensing unit, which receives outputs of the pressure sensors 6 to and the crank angle sensor 10, and measures the inner cylinder pressure. The inner cylinder pressure sensing unit 30 is composed of interfaces 12 to 15 which convert outputs of the pressure sensors 6 to 9 to voltage values, a timing interface 16 which receives the outputs of the crank angle sensor 10, a single chip microcomputer (hereinafter microcomputer) 26 having A/D converter 27 and the memory 28, and a multiplexer 29 which selects and switches the outputs of the interfaces to 15 according to a control order of the microcomputer 26, and transmits them to the A/D converter.

Figure 3A:
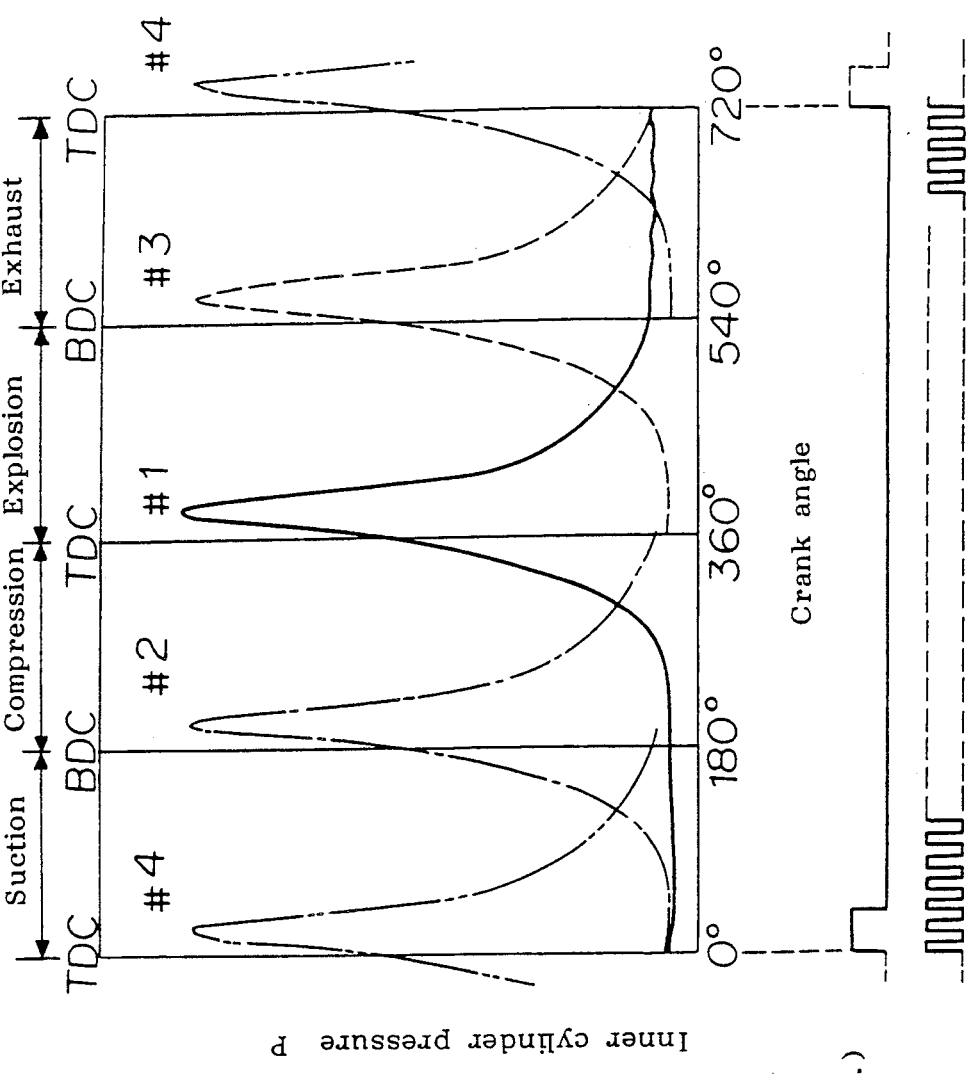

In this structure, the outputs of the pressure sensors 6 to 9 are inputted to the multiplexer 29 through the interfaces to 15, wherein the signals are selected and inputted to the microcomputer 26. FIGS. 3A to 3C show the change of pressure and the wave pattern of the cylinders 2 to 5 corresponding with the crank angle of a four cycle, four cylinder engine. In FIG. 3A, the bold line signifies a pressure wave pattern of the first cylinder #1 of the engine 1, wherein BDC is a bottom dead center, and TDC is a top dead center. The dotted line signifies the pressure wave pattern of the third cylinder #3, the alternate long and short dash line, that of the second cylinder #2, and the alternate long and two short dashes line, that of the fourth cylinder #4.

As shown in FIG. 3A, in a four cylinder engine, the combustion cycle of each cylinder has a phase difference of 180 degrees in crank angle. As for the pressure wave patterns of #2, #3, and #4 cylinders, only the compression the explosion strokes thereof are illustrated, and the suction and the exhaust thereof strokes are omitted.

The crank angle sensor 10 generates a cylinder identifying signal at every 720 degrees as shown in FIG. 3B, and generates a crank angle signal at every 1 degree as shown in FIG. 3C. These signals are inputted to the microcomputer 26 through the interface 16. Corresponding to these signals, the pressure signal selected by the multiplexer 29 is converted from an analogue to digital value by the A/D converter 27 at the predetermined crank angle, and memorized by the memory 28.

Figure 4:
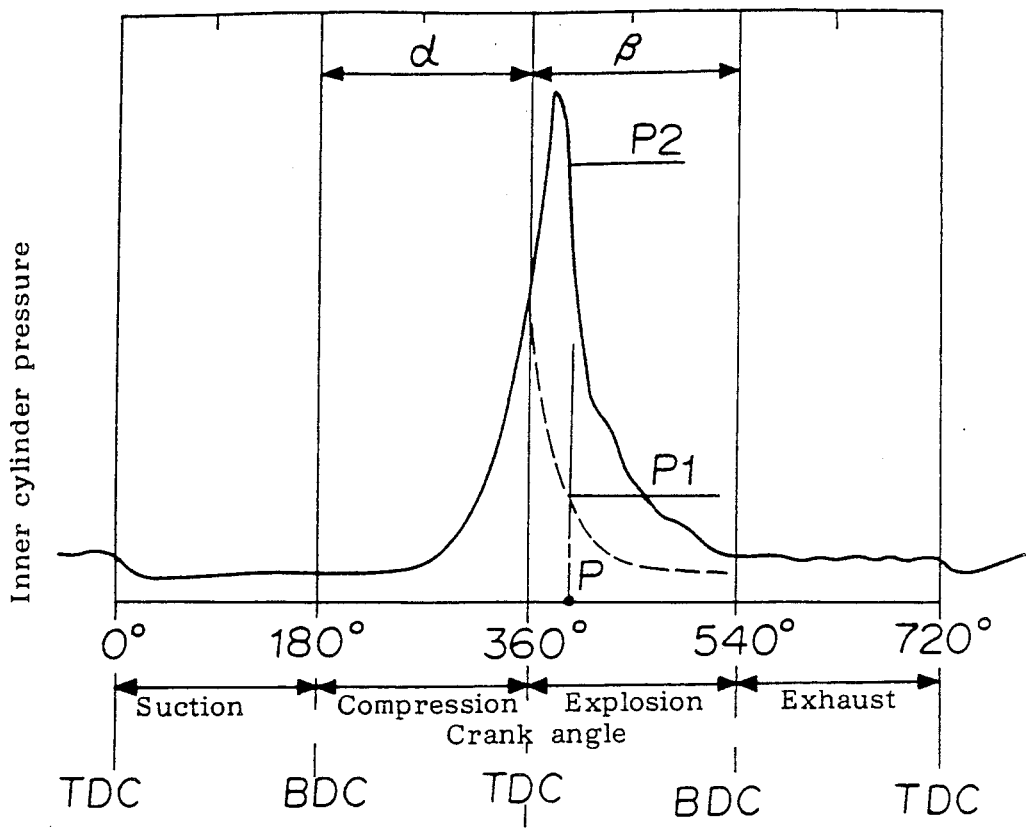
FIG. 4 is a graph showing the change of the inner cylinder pressure.

Next, explanation will be given to a clear-cut method of the misfire detection. FIG. 4 shows the relationship between the misfire and the pressure wave pattern, in which the bold line shows the pressure wave pattern in a normal combustion. The mixture charged to a cylinder in the suction stroke, is pressurized in the compression stroke, ignited in the neighborhood of TDC of compression stroke, expanded rapidly in the power or explosion stroke, and discharged outside of the cylinder in the exhaust stroke. The pressure change in case of a misfire is shown in broken line. In case of a failure of ignition or in case that a mixture ratio of air and fuel is improper, the pressure change in the explosion stroke, as shown in the dotted line, is symmetrical with the vertical line at the crank angle of 360 degrees, in the range defined by α and β. The broken line shows the case in which no combustion takes place, or the case of a complete misfire. When the degree of the misfire is slight, a pressure change exists between the bold line and the dotted line in the range β.

In this application notice is given to this behavior. The cylinder pressure P2 is measured at a predetermined crank angle point P after TDC in the compression stroke (for instance 40 degrees), compared with a predetermined pressure value P1, and a judgment is given as normal when the following equation (1) is established, and as a misfire when the relationship is not established.

$$l.P1+k \leq 2 \tag{1}$$

where l is a gain constant, and k is an offset constant which are utilized to give allowance to the criteria value of the equation (1). When l=1 and k=1, the level of a complete misfire condition is detected The gain constant l and the offset constant k may be determined according to the level of the detected misfire.

Figure 5:
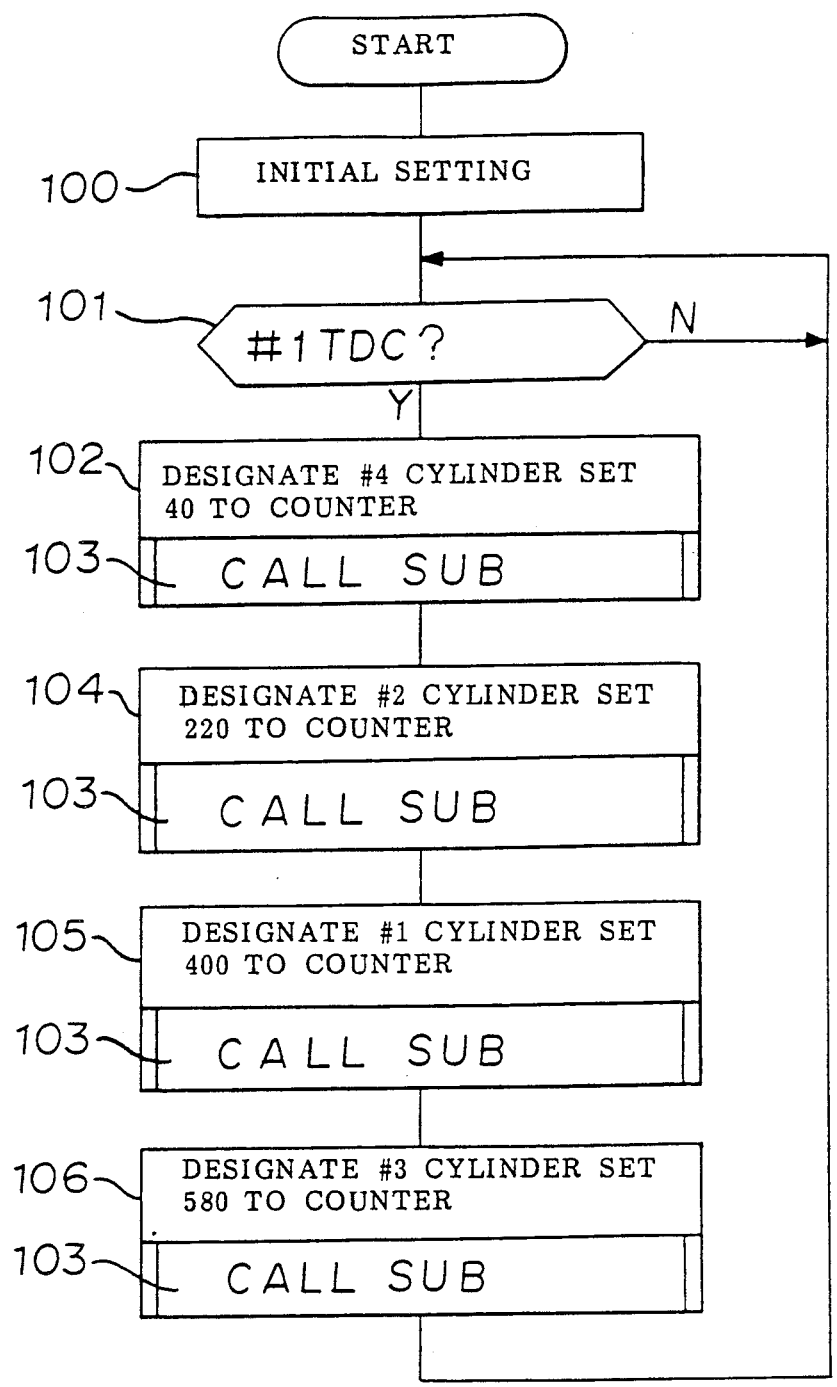
FIG. 5 is a flow chart showing the main routine in which the detection of a misfire is carried out.
Figure 6:
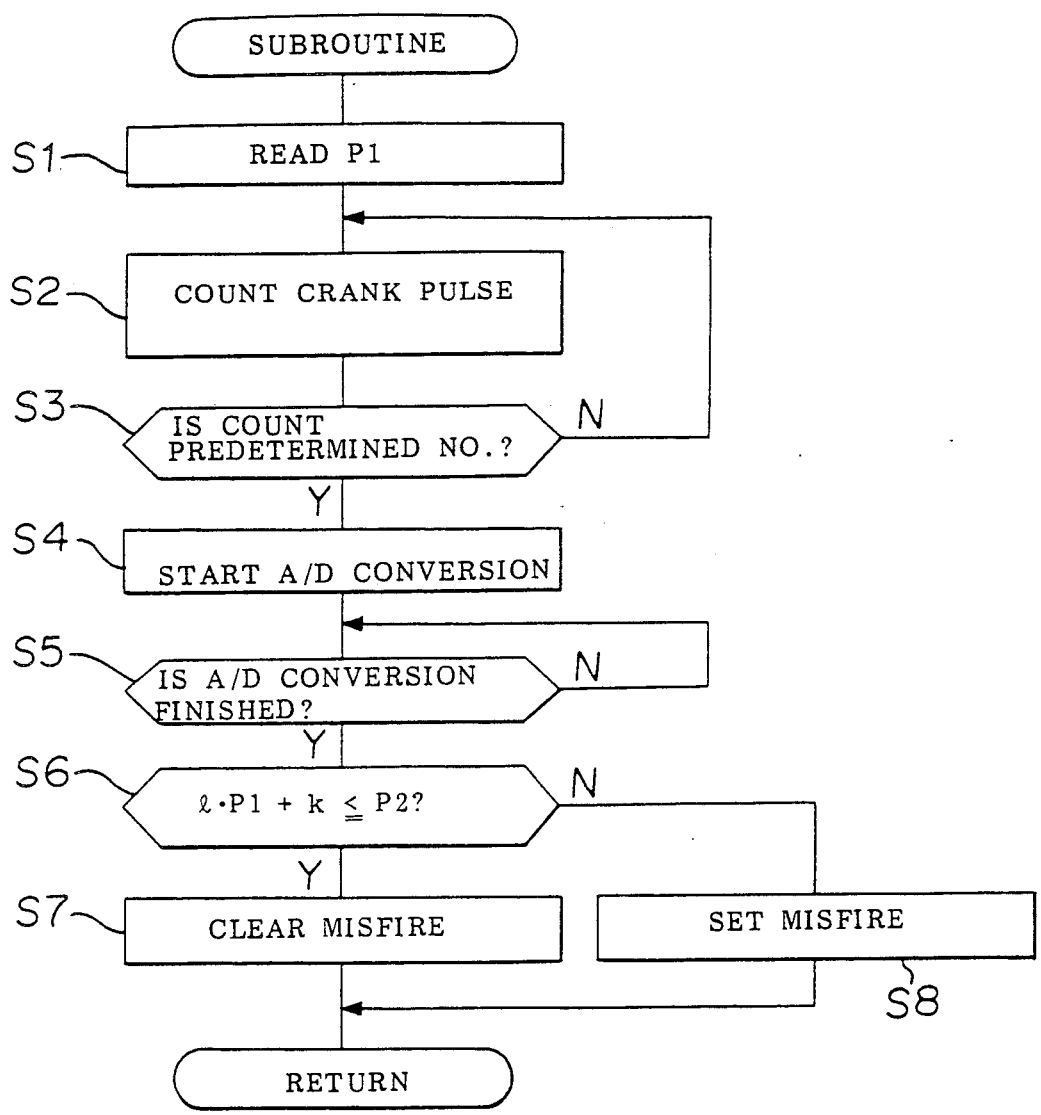
FIG. 6 is a flow chart showing a subroutine.

FIG. 5 and FIG. 6 are flow charts for detecting the misfire of each cylinder. FIG. 5 is a main routine. In step 100 which is a starting point of measurement, the memory for memorizing misfire is reset, and the counter which counts a predetermined crank angle is cleared. Next, in step 101, the rise of the cylinder identifying signal from the crank angle sensor 10 as shown in FIG. 3B, is awaited. When the cylinder identifying signal is risen, the operation goes to step 102. In step 102, the microcomputer 26 connects the fourth cylinder #4 to the A/D converter by the multiplexer 29, and sets 40 for a comparison value of the crank angle counter, in which the inner cylinder pressure is measured.

The operation goes to step 103, which is a subroutine called by the main routine in FIG. 5. The operation procedure of the subroutine is shown in FIG. 6. The angle signal from the crank angle sensor 10 is transmitted to the microcomputer 26 through the timing interface 16, as an interruption signal in the procedure of treating the program, which is utilized in step 101. The setting of the cylinder identifying signal and the counting up of crank pulses which is step S2 of FIG. 6, is carried out as an interruption treatment.

In step S1 in FIG. 6, a predetermined value P1 which judges the misfire, is read from the memory 28. In step S2, an interruption signal of the unit angle pulse from the crank angle sensor 10, is awaited. The counted value of the counter is incremented at every rise of the unit angle. In step S3, comparison is made between the comparison value of the counter given in the main routine of FIG. 5 and the counted value of step S2, and the timing for measuring the pressure is determined. In this comparison, when the counted value agrees with the comparison value, the operation goes to step S4, in which A/D conversion is started and the pressure is measured.

In step S5, finishing of A/D conversion is awaited, and when finished, the operation goes to step S6. In step S6, comparison is made between the pressure value P2 which is converted from analogue to digital value, and a misfire criteria value P1, and a judgment is made based on the equation (1). When the judgment is made as a misfire, the operation goes to step S8, and a misfire flag in the memory 28 is set. When the judgment is made as not misfire, the operation goes to step S7, and the misfire flag is cleared.

As stated above, after the judgment of the misfire, the operation returns to step 104 of the main routine of FIG. 5. In step 104, as in step 102, the A/D converter is connected to the second cylinder #2, and the set value of the crank angle for measuring the pressure is renewed to 220 which is fixed to the second cylinder. Next, step 103 which is the above-mentioned subroutine, is read, the operation in FIG. 6 is carried out, and the judgment of misfire in the second cylinder is carried out.

As in the foregoing procedures, in step 105, the first cylinder #1 is designated, and in step 106, the third cylinder #3 is designated. In step 103 the judgment of misfire is carried out. The misfire is judged according to the firing order; #4, #2, #1, and #3. The operation returns to step 101, and the judgment of misfire is repeated.

Figure 7:
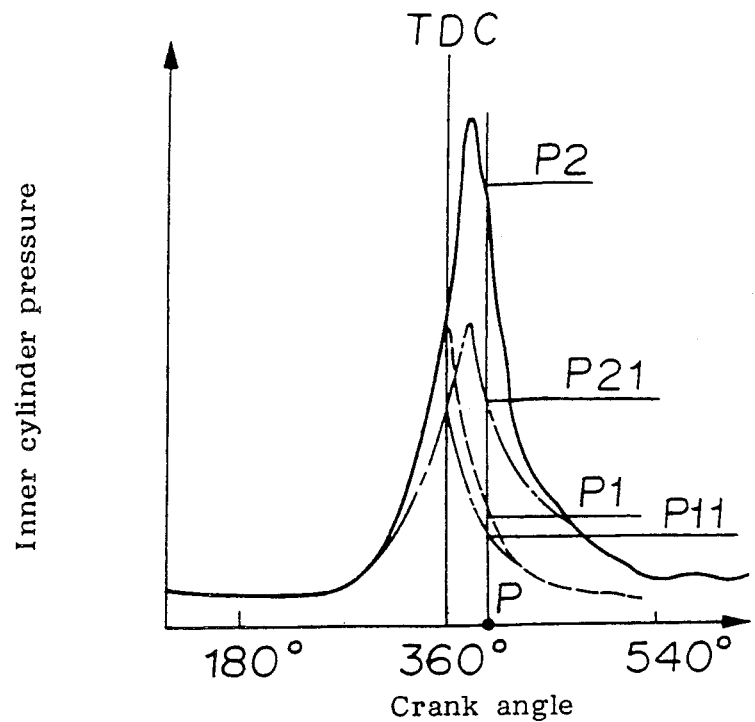
FIG. 7 is a graph showing a change of the inner cylinder pressure in case that a loading condition of the engine is changed.

Next, explanation will be given to a second embodiment of the invention. The combustion wave pattern in the engine changes in correspondence with the running condition thereof, and an example of the change is shown in FIG. 7. In FIG. 7, the normal combustion wave pattern at high load time is shown in the bold line, and the misfire wave pattern is shown in the dotted line.

The normal combustion wave pattern at low load time is shown in the alternate long and short dash line, and the misfire wave pattern is shown in the alternate long and two short dashes line.

The pressures at the misfire time which correspond to the point P of a predetermined crank angle in which the misfire is detected, vary with the load of the engine, and are signified as P1 and P11, whereas the pressures in the normal combustion time are signified as P2 and P21. Accordingly, it is necessary to change the misfire criteria value according to the running condition of the engine when the running condition varies. Therefore, in this application, a misfire criteria value map, is memorized beforehand in the memory 28 of the microcomputer 26, which corresponds with the running condition shown in FIG. 8. The map is read and utilized for judgement according to the running condition.

Figure 8:
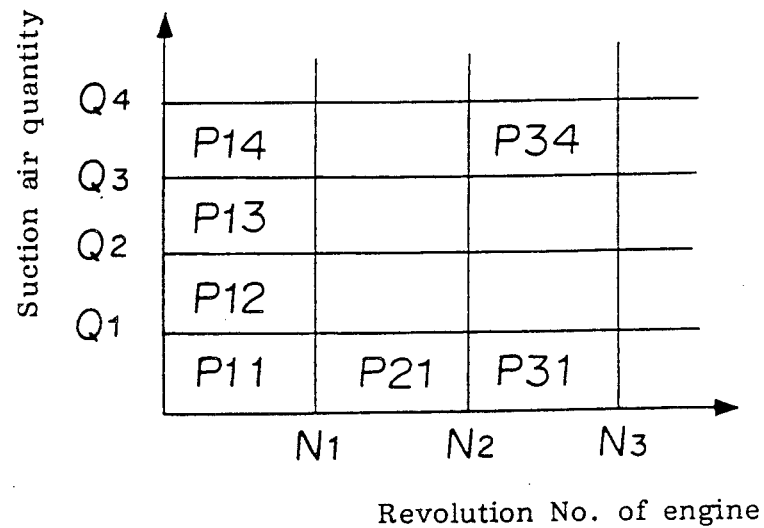
FIG. 8 is a diagram showing a criteria map related to a revolution number of the engine and a suction air quantity of the engine.

The abscissa of FIG. 8 is the revolution number N and is divided by N1, N2, N3. The revolution number is detected by measuring the period between predetermined crank angles from the output of the crank angle sensor 10. The ordinate signifies a parameter which shows the load of the engine. In FIG. 8, the suction air quantity Q1 measured by an air-flow meter, not shown, is utilized, which is divided by Q1, Q2, and Q3. A zoning is made by these divisions, and in correspondence with each zone, a misfire criteria value is allotted to a memory $P_{n,q}$, where n and q signify the division number of the abscissa and the ordinate. The flow charts for the misfire detecting are the same as before as shown in FIG. 5 and FIG. 6. The operation in FIG. 5 is the same as before, and the explanation is omitted.

In step 1 of FIG. 6, the reading of the misfire criteria value is carried out by looking up the table of FIG. 8 according to the running condition determined by the revolution number N and the suction air quantity Q. This table is utilized in step S6, for the misfire criteria value. The other operations are the same as before. As explained above, even when the running condition of the engine changes as shown in FIG. 7, the detection of the misfire is accurately carried out by the misfire criteria value corresponding with the change.

Furthermore, in this application, the suction air quantity is utilized for the ordinate in FIG. 8. However, this may be substituted by an opening degree of the throttle valve which regulates the suction air, or by a suction pipe pressure. The misfire criteria value may be changed corresponding to an ignition timing of the ignition means of the mixture, not shown. The crank angle detecting means is composed as outputting pulses for each unit angle. This may be substituted by outputting a reference position pulse at each reference position of the crank angle (for instance at 40, 220, 400, and 580 degrees as explained in FIG. 6). Furthermore, the revolution number detecting means ma measure the ignition period of the ignition coil of the ignition means, with the same result.

As explained above, in the first embodiment of this invention, the judgment of the misfire is determined when the inner cylinder pressure at a predetermined crank angle after TDC in compression stroke, is below a predetermined value. Therefore, it is not necessary to measure the peak value on the pressure, as in the conventional method, which simplifies the device. In the second embodiment of the invention, the criteria standard varies with the loading condition of the engine. Therefore an optimum judgment may be carried out in spite of the loading condition of the engine.

What is claimed is:

1. A misfire detecting device for an internal combustion engine having a cylinder, and a piston reciprocable within the cylinder and coupled to a crank shaft, said device comprising:
   pressure detecting means for detecting an internal pressure of said cylinder;
   crank angle detecting means for detecting a crank angle of said crank shaft;
   load detecting means for detecting a load of the engine;
   revolution number detecting means for detecting a revolution number of the engine; and
   misfire detecting means for determining that a misfire has occurred when the internal cylinder pressure at a predetermined crank angle after a top dead center of a compression stroke and during an engine combustion cycle, is below a predetermined value established from a combination of the detected engine load and the detected engine revolution number.

* * * * *